United States Patent [19]

Mallos et al.

[11] 4,326,221
[45] Apr. 20, 1982

[54] CENTRAL/REMOTE TELEVISION MONITORING SYSTEM

[76] Inventors: Gene G. Mallos, 12½ S. Main; Lowell T. Bartholomew, 920 S. Jefferson, both of Webb City, Mo. 64870

[21] Appl. No.: 192,169

[22] Filed: Sep. 30, 1980

[51] Int. Cl.³ .......................... H04N 5/24; H04N 7/10
[52] U.S. Cl. ..................................................... 358/210
[58] Field of Search ................................. 358/210, 185

[56] References Cited

U.S. PATENT DOCUMENTS

| | | |
|---|---|---|
| 3,534,160 | 10/1970 | Lowenstein .................... 358/185 X |
| 3,654,708 | 4/1972 | Brudner . |
| 3,746,780 | 7/1973 | Stetten et al. . |
| 4,008,369 | 2/1977 | Theurer et al. . |
| 4,019,180 | 4/1977 | Graves . |
| 4,028,733 | 6/1977 | Ulicki . |
| 4,064,460 | 12/1977 | Gargini . |
| 4,120,004 | 10/1978 | Coutta . |
| 4,170,024 | 10/1979 | Dischert ................................. 358/41 |
| 4,190,863 | 2/1980 | Dischert et al. ..................... 358/210 |

FOREIGN PATENT DOCUMENTS 1925815 12/1970 Fed. Rep. of Germany ...... 358/210

*Primary Examiner*—Robert L. Richardson
*Attorney, Agent, or Firm*—Lane, Aitken, Kice & Kananen

[57] ABSTRACT

A central/remote television monitoring system in accordance with the present invention includes a central station having a control signal transmitter for transmitting dual-tone camera select and single-tone camera control signals to a remote station and an audio/video receiver for receiving audio/video signals transmitted from the remote station. The remote station includes a plurality of television cameras and a control signal receiver and decoder for decoding the dual-tone camera select signals and the single-tone camera control signals received from the central station and for enabling and controlling a selected camera. An audio/video transmitter transmits the audio/video signal from the selected camera to the central station for further processing. The remote station includes an auto-enable feature by which the remote station can enable itself and the central station and a camera identification video generator for positively identifying the selected remote camera at the central station.

10 Claims, 8 Drawing Figures

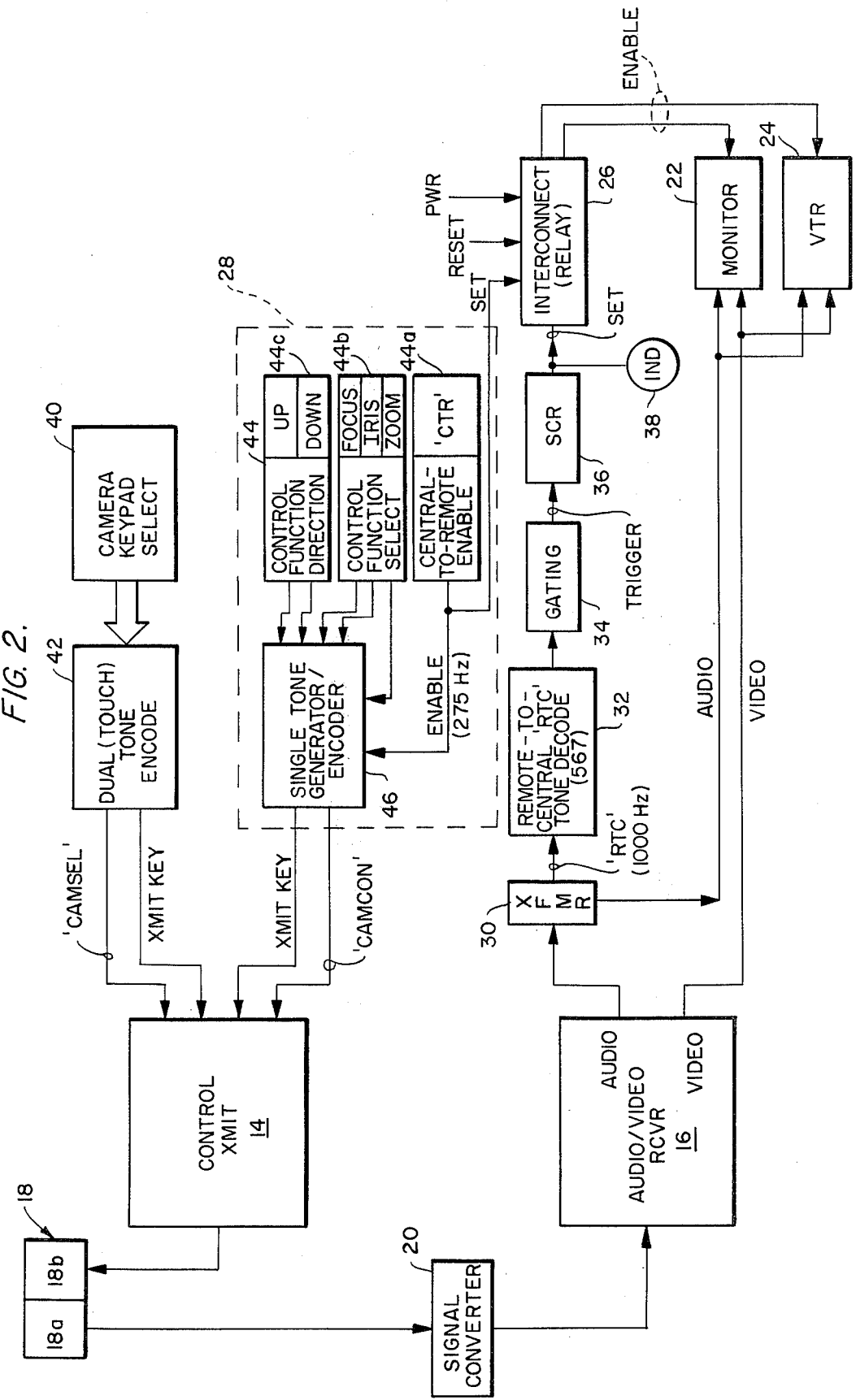

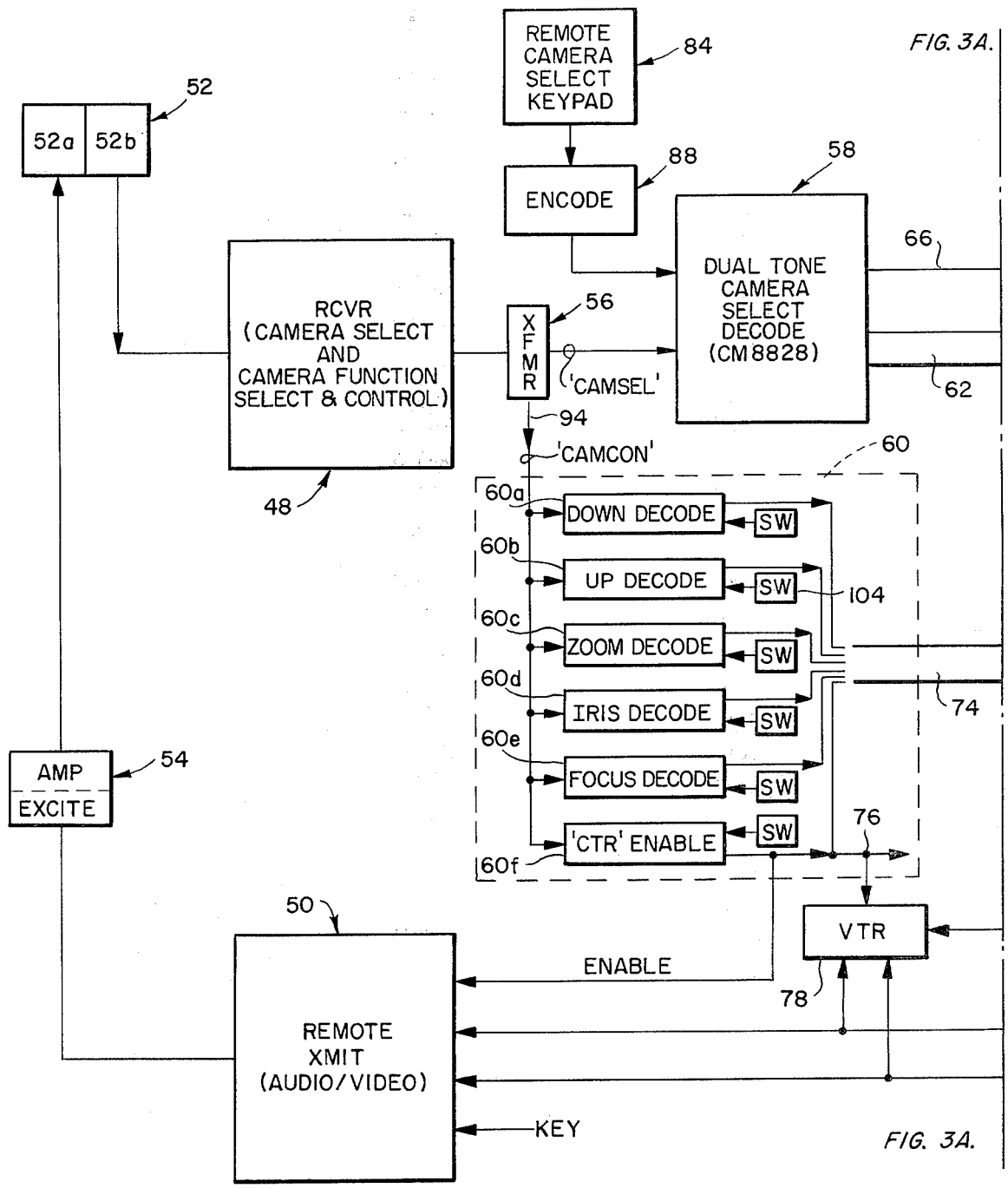

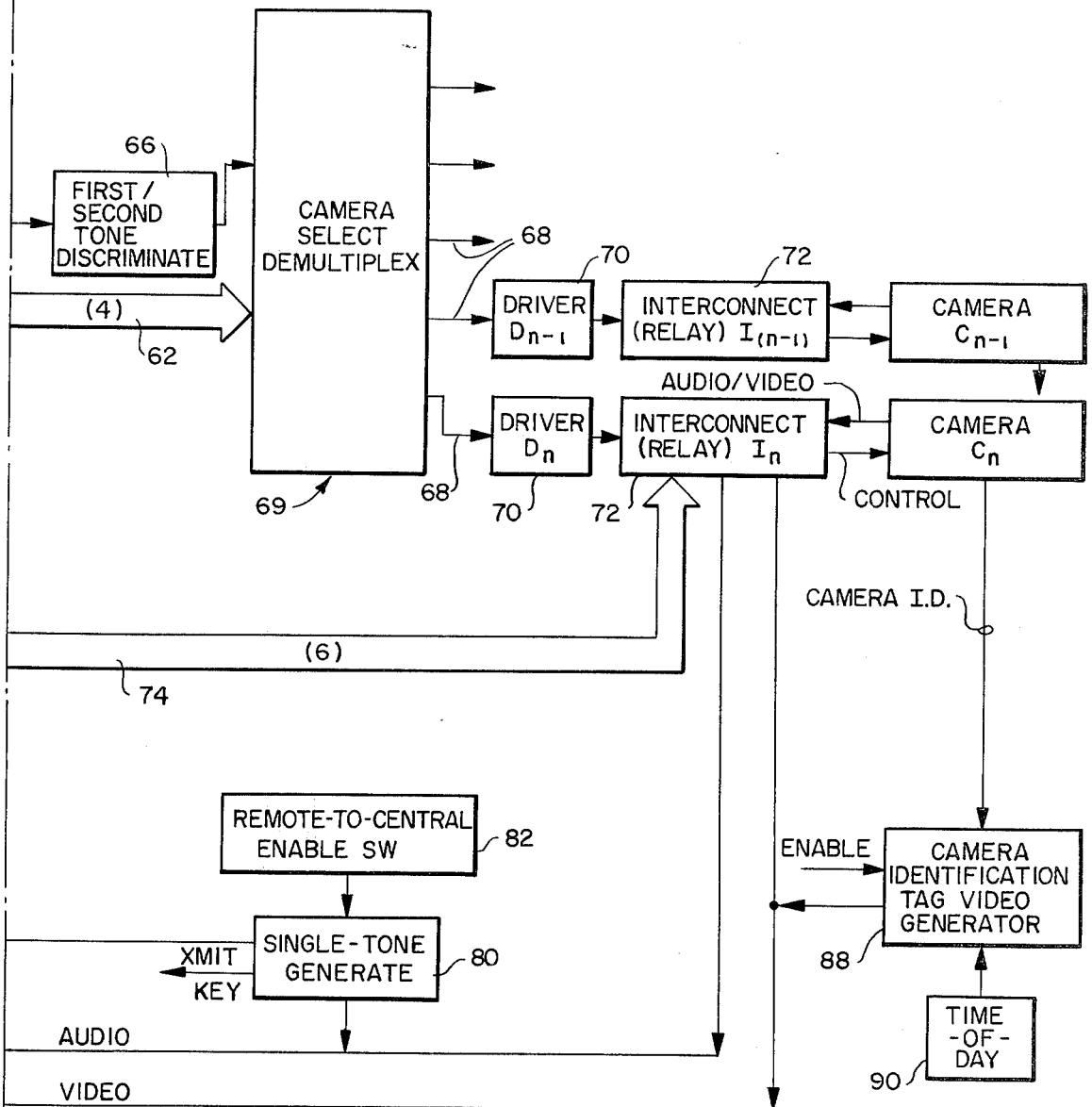

CENTRAL/REMOTE TELEVISION MONITORING SYSTEM

FIELD OF THE INVENTION

The present invention relates to television monitoring systems and, more particularly, to television monitoring systems in which various remote cameras can be selected and controlled from a base or central station.

BACKGROUND OF THE INVENTION

Conventional television monitoring systems fall into two general catagories: those utilizing hardwired connections between the cameras and a central location and those utilizing radio-link communications. The hardwired type of systems are generally confined to studio environments or other fixed locations in which it is convenient to interconnect the individual television cameras via cables extending between the cameras and a central console that includes monitors and personnel to effect coordinated operation of the system. In studio applications, the individual cameras are typically manned by a cameraman who adjusts the camera lens or otherwise effects optical control in response to audio instructions from the central location. At the central location, the output signals of the cameras may be selected for subsequent transmission. In those systems in which the remote television cameras are coupled to a central location via radio transmission links, the cameras are also typically controlled at the location by a cameraman who effects pointing control and control over the optics of the system, under control of personnel at a central location. Both types of systems suffer from the disadvantage that personnel must be located at the remote station to effect operation of the camera. In other types of television monitoring systems, a plurality of television cameras are located at fixed positions in a specific facility, for example, the security perimeter of an industrial installation, with these cameras hardwired to a central location which includes monitors to permit central station personnel to observe the secured area. Typically, the fixed cameras do not have optical control and are designed merely to scan a predetermined area and provide the television image information to the central location.

It is a broad overall object of the present invention to provide a television monitoring system to permit observation of various locations by plural cameras with simple and reliable selection and control of the cameras from a central location.

It is another object of the present invention to provide a wide area television monitoring system in which selection and control of a plurality of remotely located cameras can be effected from a central location in which the central location and the remote location are coupled through a radio communication link.

It is still another object of the present invention to provide a wide area television monitoring system in which the central station is coupled to a remotely located station by a radio communications link whereby one or both of the central and/or remote locations may be mobile relative to the other.

It is still another object of the present invention to provide a wide area television monitoring system that includes a plurality of television cameras that may be controlled either through the central station or the remote station.

It is still another object of the present invention to provide a wide area television monitoring system that includes a central station and a remote station having a plurality of television cameras that are selected, enabled, and controlled from either the central or the remote station and in which the remote station includes means by which the remote station simultaneously auto-enables and enables the central station.

In accordance with these objects, and others, a television monitoring system in accordance with the present invention includes a central station coupled by a radio communications link to a remote station that includes a plurality of audio/video cameras connected thereto. The central station includes a control signal generator/encoder means for generating dual-tone camera select signals and single-tone camera control signals and a transmitter for transmitting the tone encoded control signals to the remote station. A control-signal receiver at the remote station receives the so-transmitted camera select and camera control tone-encoded signals and provides these signals to a decoder which effects decoding and selection and control of a selected camera. An audio/video signal transmitter is provided at the remote station to transmit the audio/video signal provided from the selected camera to an audio/video receiver located at the central station to permit monitoring and recording of the signal from the so-selected camera. In addition, means are provided at the remote station to permit the remote station to substantially simultaneously auto-enable and enable the central station in response to a predetermined occurence or event. In accordance with another feature of the present invention, a camera identification generator is provided to superimpose the camera identification information and, if preferred, time-of-day information on the camera video output signal to positively verify the identity of the selected camera at the central location.

The monitoring system advantageously permits flexible control over a large number of cameras and convenient camera selection and control from the central location and includes the feature whereby the remote station may auto-enable itself and an otherwise dormant central station. Video time-tag and camera identification information is superimposed upon the selected camera's video signal to permit convenient verification of the selected camera identity at the initiating remote location.

The system may be used in a wide number of applications including, for example, applications in which the central station is mobile relative to a fixed remote station (that is, a plurality of fixed cameras at the perimeter of an industrial installation with the central station mounted in a mobile vehicle for monitoring purposes); applications in which the remote station is mobile relative to the fixed station (for example, a plurality of cameras located on or in different sections of an aircraft for selection and control thereover by a land-fixed central station); and those applications in which both the central and remote station are mobile (for example, a plurality of cameras located on an aircraft for selection and control thereover by a central station on another aircraft).

BRIEF DESCRIPTION OF THE DRAWINGS

The above description as well as further objects, features, and advantages of the present invention will be more fully understood by reference to the following description of a presently preferred but nonetheless illustrative embodiment when taken in connection with the accompanying drawings wherein:

FIG. 2 illustrates a functional block diagram of a central control station shown in FIG. 1 including means by which the central control station may be enabled for operation in response to a signal provided from the remote station;

FIG. 3 illustrates a portion of a functional block diagram of a remote station shown in FIG. 1 including means for enabling a selected one of a plurality of remote cameras and effecting control thereover and means for auto-enabling the remote station and enabling the central station;

FIG. 3A illustrates the remaining portion of the functional block diagram of the remote station shown in FIG. 3;

FIG. 3B is a legend illustrating the manner in which FIGS. 3 and 3A are to be read;

DESCRIPTION OF THE PREFERRED EMBODIMENT

Figure 1:
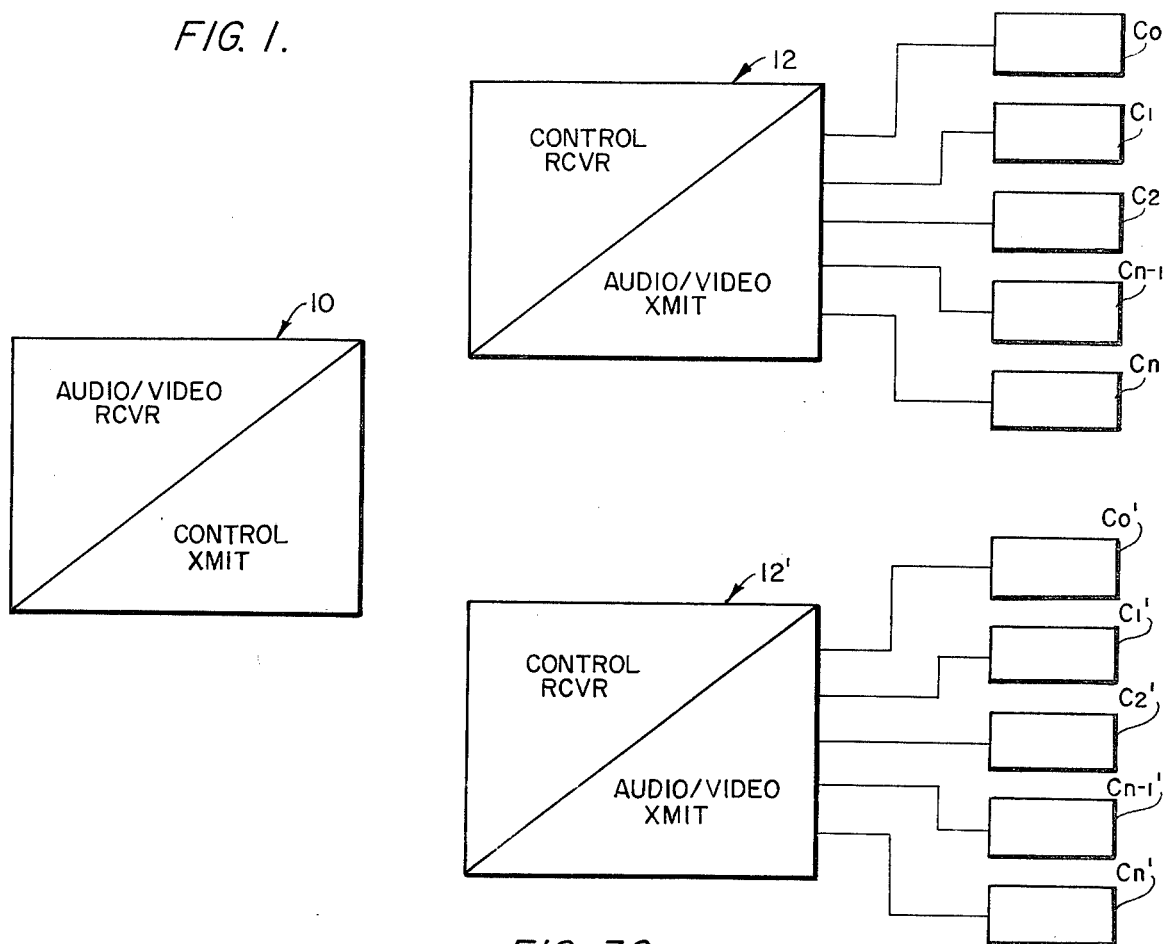
FIG. 1 is a system functional overview of a central/remote television monitoring system in accordance with the present invention.

A functional overview of the central/remote television monitoring system in accordance with the present invention is shown in block form in FIG. 1 and includes a base or central station 10 and at least one remote station 12 and, if preferred, additional remote stations 12'. The remote station 12 is connected to and adapted to cooperate with a plurality of image receiving television cameras $C_0, C_1, C_2, \ldots C_{n-1}$, and $C_n$ with each camera (either color or black and white) being subject to selection and control from the central station 10. A suitable camera is the RCA model TC1000 camera equipped with Vicon V100 series lens controls. In a like manner, the remote 12' is connected to and adapted to cooperate with a plurality of cameras $C_0, C_1, C_2, \ldots C_{n-1'}$, and $C_{n'}$. As described more fully below in connection with FIGS. 2-3D, both the central and remote stations, 10 and 12, include control and information transmitting and receiving capabilities by which audiovisual information and single-tone and dual-tone control signals are transferred.

A schematic block diagram of a central station 10 is shown in FIG. 2 and includes a control signal transmitter 14 that is adapted to transmit dual-tone camera selection 'CAMSEL' signals and single-tone camera control 'CAMCON' signals to the remote station 12 to effect camera $C_n$ selection and control thereof. A receiver 16 is provided that is adapted to receive both audio and video signals provided by the selected camera $C_n$ and transmitted from the remote 12. The receiver 16 is also adapted to receive a central station 'enable' tone-encoded control signal transmitted to the central station 10 from the remote 12, as described more fully below. An antenna 18 is provided that includes an antenna section 18A for connection to the transmitter 14 and another antenna section 18B for connection to the receive 16 through an appropriate received-signal converter 20.

In those cases where more than one remote station 12, 12', . . . is provided with each remote transmitting information on a unique frequency, multiple receivers 16, 16', . . . may be provided at the central station 10 with each receiver 16, 16' . . . adapted to receive information from an associated remote station 12, 12', . . . . In the alternative, the receiver 16 may be of the multi-frequency scanning type adapted to cyclically scan the various transmitting frequencies.

The receiver 16 is designed to receive both audio and video signals from the remote 12 with these signals being provided to both a video monitor or monitors 22 and a video tape recorder 24. The video and audio signals can be transmitted and received on separate channels, or, if preferred, the audio signal can be superimposed on the video signal for transmission, with the audio signal then extracted at the receiver 16. Both the monitor 22 and the video tape recorder 24 are enabled through an interconnect relay 26 which, in turn, is operated either by a decoded remote-to-central 'RTC' enable tone-encoded signal provided from the receiver 16 or by another enable signal provided from the control portion of the central station 10 enclosed within the broken line rectangle and designated generally by the reference character 28 (described more fully below in connection with FIG. 2A). The remote-to-central enable signal 'RTC' is provided from the receiver 16 audio output channel, with this signal originally transmitted from the remote 12. The audio output from the receiver 16 is provided to a transformer 30 which provides a portion of the audio output to the monitor 22 and the video tape recorder 24 and another portion to a tone decoder 32 which is adapted to discriminate the remote-to-central tone encoded enable signal 'RTC' operates a gating circuit 34 to trigger a thyristor such as an SCR 36 which, in turn, sets the interconnect switching or relay 26 to enable the monitor 22 and the video tape recorder 24 to permit the received audio and video signals to be both monitored and recorded. An indicator 38, which may take the form of either an audio and/or visual indicator is connected to the output of the SCR or other convenient point in the circuit to provide an indication to central station personnel that a remote-to-central enable signal 'RTC' has been received at the central station 10.

The camera selection circuitry includes a camera select keypad 40 connected to a dual tone encoder 42 which, in turn, is connected to the control transmitter 14 input. The keypad 40 may take the form of a conventional 3×4 touch-tone keypad having the digits 0-9 and the symbols * and #, and the encoder 42 may also be of the conventional type designed to interface with the aforementioned keypad 40 and provide touch-tone signals in accordance with or otherwise compatible with the Bell System touch-tone telephone standard. The encoder 42 also includes a 'key' signal output to key the transmitter 14 when encoded camera selection control signals 'CAMSEL' are being transmitted. In the preferred embodiment, the conventional 3×4 touch-tone keypad permits selection of up to $C_n$ cameras where n=99. As can be appreciated by those skilled in the art, the numeral n is unbounded and can be expanded to any preferred value, e.g. 999. A suitable keypad and encoder combination is the Model TTP-1 or -2 tone encoders manufactured by Data Signal, Inc.

The camera control circuitry 28 includes camera function select and control key or switch pad 44 which controls a single-tone generator/encoder 46. The camera function selection and control unit 44 includes a section 44A which provides a central-to-remote enable signal 'CTR' to both the single-tone generator 46 and to the aforedescribed interconnect relay 26; a camera function select section 44B which permits selection of, for example, focus, iris, and zoom functions of the select camera; and a control function direction section 44C which permits bidirectional control of the selected function (for example, shifting the selected focus function in one direction or the other, opening or closing the selected iris function, or changing the zoom function magnification in one direction or the other). The single-tone generator 46 generates a selected control tone for each of the above described functions. In the preferred embodiment, the central-to-remote enable signal 'CTR' is a 275 Hz tone, the focus function select is a 400 Hz tone, the iris function select is a 550 Hz tone, the zoom function select is a 650 Hz tone, the 'up' function control is a 750 Hz tone, and the 'down' function control is a 900 Hz tone. As in the case of the dual-tone encoder 42, the single-tone encoder 46 includes a 'key' output to key the transmitter 14 when any one of the camera enable, camera function selection, or function control switches are operated.

While the preferred embodiment as shown and described herein provides focus, iris, zoom, up, and down camera control signals, other camera control signals may be provided if preferred, such as, but not limited to, camera pan and tilt control signals. In addition to the provisions for the camera control signals described above, other control signals can be similarly provided to effect control over ancilliary devices such as scene illumination lamps, motors, electrically actuated locks, and the like.

Figure 2A:
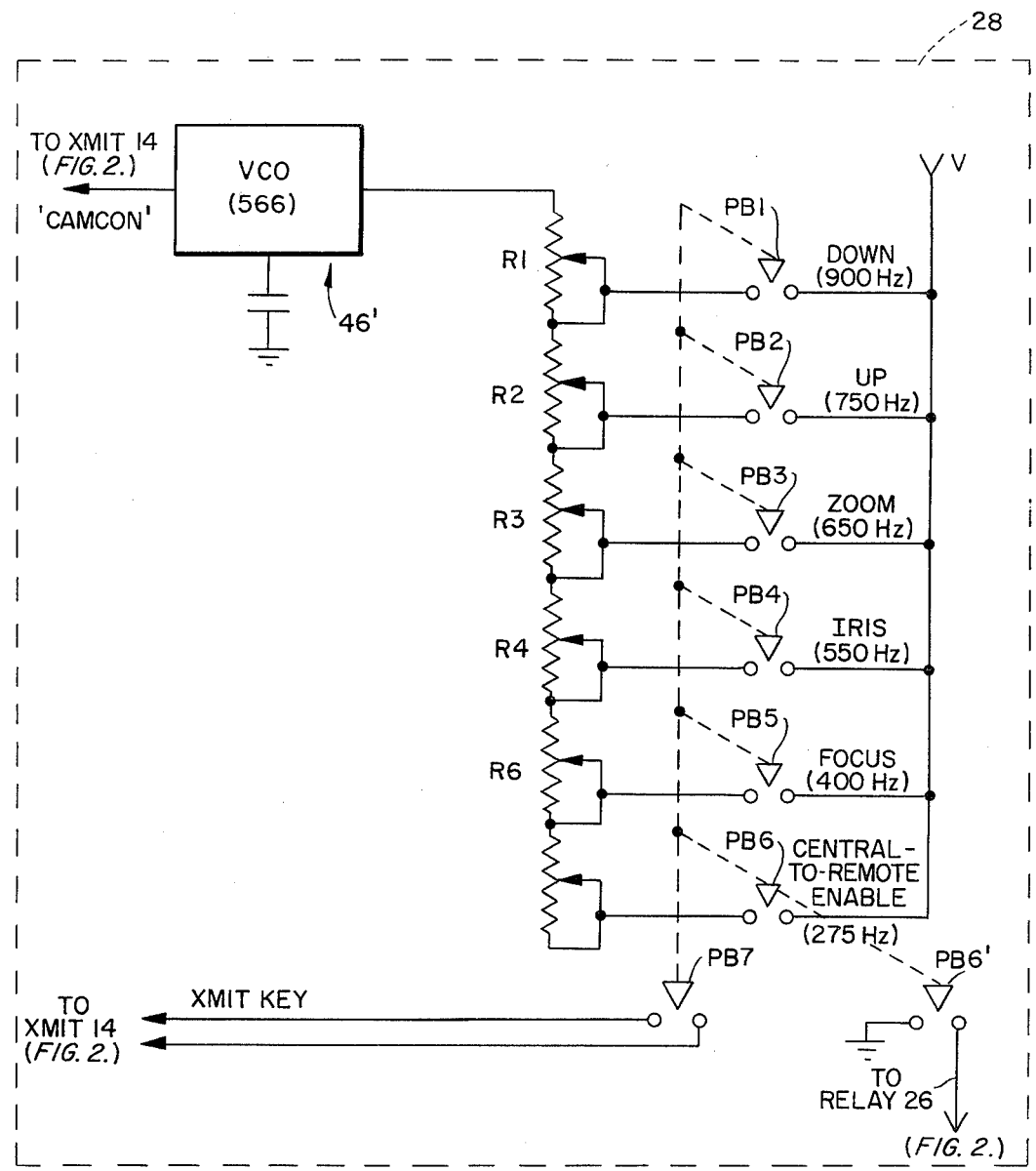
FIG. 2A illustrates a circuit diagram for a single-tone encoder portion of the central control station for providing various control signals to the remote station illustrated in FIG. 1.

A greater appreciation of the operation of the camera control signal generation of FIG. 2 can be had by consideration of the circuitry shown in FIG. 2A which includes a voltage controlled oscillator (VCO) 46' which functions as the single-tone generator/encoder 46 of FIG. 2. A voltage divider network that includes serially connected resistors $R_1$, $R_2$, $R_3$, $R_4$, $R_5$, and $R_6$ is connected to the input of the voltage controller oscillator 46'. Each of the resistors $R_1, \ldots R_6$ is in the form of a variable resistor (for example, an adjustable potentiometer) in which the movable contact of each resistor is serially connected with a source of voltage V through, respectively, single-pole push button switches PB1, ... PB6. Each of the push buttons PB is mechanically connected or otherwise coupled to a push button contact set PB7 which is connected to and keys the transmitter when any one of the push buttons PB1 ... PB6 is actuated. Actuation of a selected one of the push buttons causes a voltage of selected potential to be presented to the input of the voltage controlled oscillator 46' with the oscillator then providing a single-tone output of selected frequency corresponding to the selected control function. For example, actuation of the push button PB3 causes the voltage controlled oscillator 46' to develop a 650 Hz tone signal to select the zoom camera function while actuation of the push button PB2 causes the voltage controlled oscillator 46 to develop a 750 Hz tone signal to effect control in the 'up' direction of the so-selected zoom function. The push button PB6, which provides the central-to-remote enable signal 'CTR' of 275 Hz is also connected to a push button contact set PB6' which provides a 'set' signal to the interconnect relay 26 of FIG. 2 to enable the monitor 22 and the video tape recorder 24 as described above.

As can be appreciated from the discussion above, the transmitter 14 is adapted to transmit tone encoded audio signals for enabling the receiver 12 (the 275 Hz central-to-remote enable signal 'CTR'), select one of a plurality of cameras $C_0, C_1, C_2 \ldots C_n$ by appropriate operation of the keypad 40 to provide dual-tone camera select signals 'CAMSEL'; and select one of a plurality of camera control functions (focus, iris, zoom) and effect directional control of the selected function (e.g., up-down) by appropriate operation of the key or switch pad 44 to provide single-tone camera control signals "CAMCON." Additionally, the receiver 16 is adapted to receive the audio and video signal of the enabled remote and the selected camera $C_n$ as well as receive a remote-to-central enable signal 'RTC' transmitted to the central station 10 on the audio channel and appropriately decoded to provide an enable signal for the monitor 22 and the video tape recorder 24.

A schematic/block diagram of a remote station 12 is shown in FIGS. 3 and 3A (as read in accordance with the legend of FIG. 3B) and includes a receiver 48 for receiving the dual-tone camera select signals 'CAMSEL', the signal-tone camera function and control signals 'CAMCON', and a transmitter 50 for transmitting video and audio information from the selected camera $C_n$ to the receiver 16 (FIG. 2) at the central station 10. Additionally, the transmitter 50 is adapted to transmit the aforedescribed remote-to-central enable signal 'RTC' on its audio channel as described in more detail below. Both the receiver 48 and the transmitter 50 are connected to an appropriate antenna 52 that includes, respectively, an antenna 52A for connection to the transmitter 50 through an appropriate exciter and power amplifier 54 and a section 52B for connection to the receiver 48. A suitable transmitter/receiver combination (transceiver) for use in the central and remote stations is the Kenwood Model TR 7600 FM Transceiver.

The output of the receiver 48, which consists of the single-tone and dual-tone control and selection signals is inputted to a transformer 56 which provides a portion of the dual- and single-tone signals to a dual-tone decoder 58 and a single-tone decoder that is enclosed within the broken line enclosure 60. The dual-tone encoder 58 (for example, a Mitel CM 8828 tone receiver) decodes the dual-tone camera select signal 'CAMSEL' and provides a 4-bit parallel binary output along buss 62 to a camera select demultiplexer 64. The dual-tone camera select information is also provided to a first tone-set/second tone-set discriminator 66 which assists the demultiplexer 64 in determining the sequential order of the camera select digits. The first tone-set/second tone-set discriminator 66 may take the form, for example, of a D-type flip-flop configured with associated logic for toggling with each successive dual-tone select signal. The demultiplexer 64 may take the form of a programmed logic array (PLA) or, in the preferred embodiment, a plurality of cascaded 4514 and 4515 CMOS 1-of-16 decoders.

The camera select demultiplexer 64 receives the 4-bit parallel input from the dual-tone decoder 58 for both the first and second digits of the camera select signal 'CAMSEL' as well as the first/second tone-set indication from the discriminator 66 and then selects and enables one of its n camera select output lines 68. Each of the output lines 68 is connected to an associated driver 70 which, in turn, connects to and drives interconnect switching 72, which, when enabled, effects the necessary interconnects to permit the selected camera $C_n$ to operate as described more fully below.

The single-tone decoder 60, which receives a portion of the single-tone camera control signal 'CAMCON' from the transformer 56 consists of a plurality of individual tone decoders 60a, b, c, d, e, and f for discriminating the various control function-select tones and function-control tones. The single-tone decoder 60 is connected to the interconnect switching 72 by a plurality of parallel control lines along buss 74 to effect camera function and function control as described more fully below. The single-tone decoder 60 also provides an enable output along line 76 to permit enabling of the transmitter 50 and, if also preferred, a video tape recorder 78 located at the remote station 12.

The transmitter 50 is adapted to transmit both the audio and visual information signals from the selected camera $C_n$ with these signals being provided through appropriate channels under the control of the interconnect switching 72. In addition, the audio channel is adapted to carry, as described above, the remote-to-central enable signal 'RTC' that is provided by a single-tone generator 80 that has its output connected to the audio channel and its input connected to a remote-to-central enable switch 82 that can be, for example, a manually operated switch, a cyclically or periodically operated switch operated under the control of a preprogrammed timer, or a switch adapted to operate in accordance with a specified event, such as an unauthorized intrusion. An appropriate 'key' signal for keying the transmitter 50 is also provided when the remote-to-control 'RTC' enable tone signal is transmitted to the central station 10.

The remote station 12 also includes a camera-select keypad 84 connected through a dual-tone encoder 88 to permit camera selection to be made at the remote 12 as well as by 'CAMSEL' signals received from the central station 10.

In order to provide the base station 10 with the identity of the selected camera $C_n$ (especially in those instances where camera select is effected at the remote via the keypad 84), the remote 12 is provided with a camera ID and time-tag video generator 88 which receives camera ID information from the selected camera $C_n$ and time-of-day information from an appropriate clock 90 and generates a video signal that is superimposed upon or otherwise combined with the video output of the selected camera $C_n$. In addition to providing the camera ID and time-tag information, the video generator 88 can be used to generate other or additional information for superimposition on the transmitted video signal. For example, where the remote station 12 is located on an aircraft, the video generator 88 can generate the aircraft alpha-numeric identity number or other preferred call or identifying information.

Figure 3C:
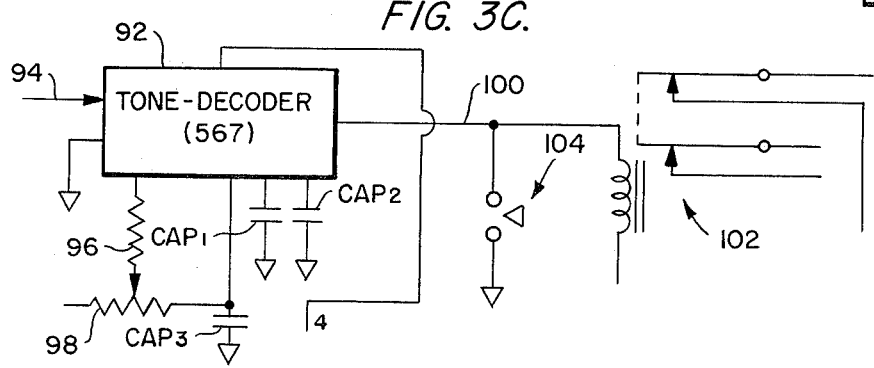
FIG. 3C is a circuit diagram of an exemplary single-tone decoder shown in FIG. 3.

A greater understanding of the operation of the single-tone decoders 60a, b, ... f may be had by a consideration of the representative decoder circuit of FIG. 3C. As shown therein, the tone-decoder takes the form of a standard 567 IC 92 that receives the tone signal on its input line 94. A fixed resistor 96 and a variable resistor 98 and three capacitors CAP1, CAP2, and CAP3, are provided to 'tune' the IC 92 to its selected tone. The output of the IC 92 along line 100 operates a relay 102 which, in turn, controls the selected camera function.

Additionally, a switch or push button 104 is provided to permit local control of the camera functions at the remote 12.

Figure 3D:
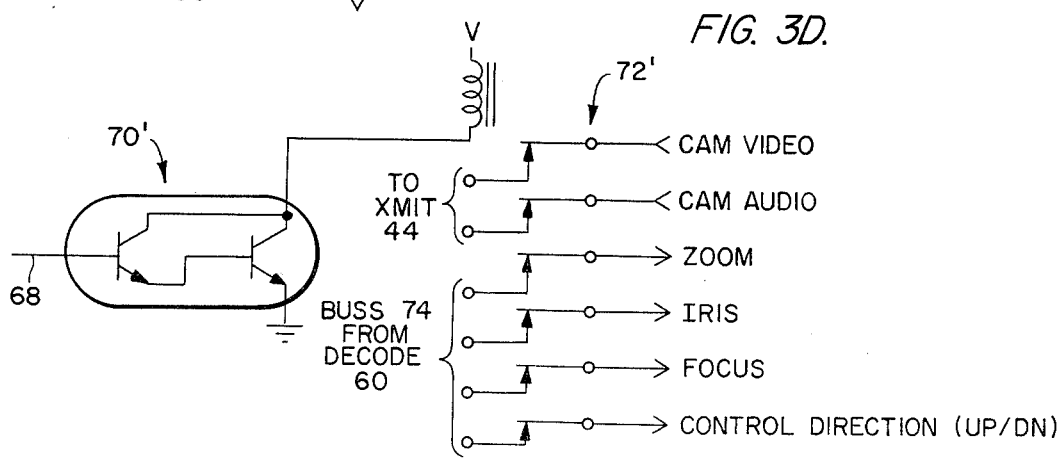
FIG. 3D is an exemplary circuit diagram of a interconnect relay and driver therefor.

While various relays or switch arrangements are suitable, the preferred switching arrangement for the interconnect switching 72 is shown in FIG. 3D and, as shown therein, includes a driver 70 in the form of a Darlington transistor 70' and a relay 72', which in the case of the preferred embodiment, is a 6-pole single-throw relay adapted, when energized in response to a 'CAMSEL' signal, to connect the camera audio and video channels to the transmitter 50 and connect the single-tone 'CAMCON' signal lines to the selected camera $C_n$.

The above-described system can be operated in one of several modes by which wide area television monitoring can be effected in a fixed or mobile location. In a typical application, individual cameras $C_0, C_1, C_2, \ldots C_{n-1}$, can be situated at preferred positions at the remote station location with the central station located separately from the remote station but within the range of the control and audio/video transmitter and receivers. Thereafter, personnel at the central station can, by appropriate operation of the central-to-remote enable button PB6 (FIG. 2A), send a single-tone enable signal from the central station to the remote 12 with this single tone being received by a receiver 48 and decoded by decoder 60F (FIG. 2A) to provide an enable signal to the remote transmitter 50 and the remote video tape recorder 78 as well as the remaining remote control-and-operation circuitry to thereby enable the remote station. Thereafter, a one of the $C_n$ cameras may be selected by operation of the central station camera select keypad 40 (FIG. 2) to send dual-tone encoded camera selection signals 'CAMSEL' through the control transmitter 14 to the remote station receiver 48 with this information being decoded by decoder 58 to cause the demultiplexer 64 to select and enable the selected camera $C_n$. The video and audio output as well as the necessary identification tag video information from the selected camera $C_n$ is then inputted to the remote transmitter for transmission to the central station 10 where the video and audio information can be observed on the central station monitors 22 and recorded on the central station video tape recorders 24. In this mode of operation, the cameras $C_n$ may be sequentially selected and their operation controlled by the signal-tone generator circuitry of FIG. 2A to control the selected images. In an alternate mode of operation, when the central station 10 is dormant or otherwise not enabled, the remote station 12 may auto-enable and enable the central station 10 into operation when the remote-to-central enable switch 82 is actuated either, as described above, by manual manipulation thereof, under the control of a preprogrammed timer, or in response to a selected disturbance such as an intrusion, to generate a tone-encoded remote-to-central signal 'RTC' which keys the remote transmitter 50 and superimposes the tone-encoded enable signal on the audio channel thereof with this enable signal transmitted to the central station 10 receiver 16 and decoded at the decoder 32 (FIG. 2) to provide an enable signal indication and operate the necessary interconnects at the central station 10 to enable the video monitor 22 and the video tape recorder 24 as well as alert central station personnel of the self-enablement of the station.

As can be readily appreciated, the central/remote television monitoring system in accordance with the present invention permits great flexibility in monitoring a selected area in which one or both of the central and remote stations can be mobile and in which camera selection and control thereover either from the central as well as at the remote station and where the remote station can auto-enable itself as well as the central station.

As can be appreciated by those skilled in the art, various changes and modifications can be made to the central/remote television monitoring system without departing from the spirit and scope of the invention as defined in the appended claims and their legal equivalent.

What is claimed is:

1. A central/remote television monitoring system for controlling a plurality of television cameras located at a remote station, said system comprising:

a central control and monitoring station having a transmitter for transmitting control signals from the central station to the remote station and a receiver for receiving audio/video information transmitted to the central station from the remote station;

first selection and encoding means at said central station for generating coded selection signals for selecting a one of n television cameras at the remote station;

second selection and encoding means at said central station for generating encoded control signals for controlling the operation of the selected television camera, the control signals generated by said second selection and encoding means including an enable signal for enabling said remote station;

said first and said second selection and encoding means connected to said central station transmitter for transmitting the encoded selection and control signals to said remote station;

utilizing means at said central station connected to an output of said audio/video information receiver for utilizing the audio/video output signals therefrom;

decoder means at said central station connected to the output of said information receiver for decoding an encoded enable signal provided at the output thereof;

central station switching means coupled to said utilizing means for enabling said utilizing means in response to an enable signal said switch means coupled to said second selection and encoding means and said decoding means so that an enable signal provided from either said second selection and encoding means or from said decoder means will enable said switch means to enable said utilizing means;

a remote station having a plurality of television monitoring cameras connected thereto, a control signal receiver for receiving the encoded control signals transmitted from the central station transmitter, and an audio/video transmitter for transmitting audio/video information from at least one of said n cameras to said audio/video receiver at said central station;

first decoder means connected to said receiver at said remote station for decoding the encoded control signals transmitted from said central station for selecting a one of said n cameras;

second decoder means connected to said receiver at said remote station for decoding the encoded control signals transmitted from said central station for effecting control over the selected one of said n cameras and the encoded enable signal transmitted from said central station;

remote station switching means connected to said first and second decoders and said audio/video transmitter for connecting the selected one of said n cameras to said audio/video transmitter in response to the decoded enable signal transmitted from said central station; and an enable signal encoding means coupled to the input of said audio/video transmitter and said remote station switching means for transmitting an enable signal to said central station to enable same and to enable said remote station switching means.

2. The central/remote television monitoring system claimed in claim 1 wherein
   said first selection and encoding means generates dual tone encoded selection signals; and
   said second selection and encoding means generates single tone encoded control signals.

3. The central/remote television monitoring system claimed in claim 2 wherein said second selection and encoding means comprises:
   a voltaged controlled oscillator connected to a voltage divider resistor network and manually operable switch means to provide voltages of selected magnitude corresponding to different control functions at the input of said voltage controlled oscillator.

4. The central/remote television monitoring system claimed in claim 1 further comprising:
   additional first selection and encoding means at said remote station coupled to said first decoding means at said remote station for selection of a one of said n cameras.

5. The central/remote television monitoring system claimed in claim 4 further comprising:
   additional second selection and encoding means at said remote station coupled to said switch means at said remote station for generating control signals for controlling the selected one of said n cameras.

6. The central/remote television monitoring system claimed in claim 1 where said first decoder means comprises:
   a dual tone decoder for providing a parallel binary output to a 1 of n demultiplexer that effects selection of 1 of n output lines in response to said parallel binary output.

7. The central/remote television monitoring system claimed in claim 1 wherein said decoder means at said central station comprises:
   a tone decoder for discriminating a tone encoded enable signal of selected frequency;
   a gating means coupled to said tone decoder and said central station switching means for operating said central station switching means in response to an enable signal to enable said utilizing means.

8. The central/remote television monitoring system claimed in claim 7, wherein said enable signal encoding means at said remote station comprises:
   a selectively operable tone generator to generate a tone of select frequency decodable by said decoder means at said central station.

9. The central/remote television monitoring system claimed in claim 1 further comprising:
   a video camera identification means coupled to said cameras and said audio/video information transmitter for providing a video identification of said selected camera.

10. The central/remote television monitoring system claimed in claim 9 further comprising:

a time-of-day sub-carrier generator for superimposing time-of-day information on the video signal from the selected camera to said audio/video transmitter at said remote station.

* * * * *